(12) United States Patent
Núñez et al.

(10) Patent No.: US 8,398,023 B2
(45) Date of Patent: Mar. 19, 2013

(54) CONTROL STATION

(75) Inventors: Miguel Gasco Núñez, Madrid (ES); Santiago Flores Giraldo, Madrid (ES)

(73) Assignee: EADS Construcciones Aeronauticas, S.A., Madrid (ES)

( * ) Notice: Subject to any disclaimer, the term of this patent is extended or adjusted under 35 U.S.C. 154(b) by 250 days.

(21) Appl. No.: 12/829,571

(22) Filed: Jul. 2, 2010

(65) Prior Publication Data

US 2011/0101176 A1    May 5, 2011

(30) Foreign Application Priority Data

Oct. 29, 2009    (ES) .................................... 200930930

(51) Int. Cl.
  *B64D 11/06*    (2006.01)
(52) U.S. Cl. ................. 244/122 R; 244/221; 244/118.6; 297/217.3
(58) Field of Classification Search ............... 244/118.6, 244/122 R, 221, 223, 228, 229, 230, 234, 244/236; 297/297.1–217.7, 344.1, 411.37, 297/411.38
See application file for complete search history.

(56) References Cited

U.S. PATENT DOCUMENTS

| | | | | |
|---|---|---|---|---|
| 2,618,447 | A | * | 11/1952 | Lecarme ....................... 244/231 |
| 4,298,176 | A | | 11/1981 | Kendall |
| 4,763,860 | A | | 8/1988 | Vauvelle et al. |
| 4,787,576 | A | | 11/1988 | McGrady et al. |
| 5,125,602 | A | * | 6/1992 | Vauvelle ....................... 244/223 |
| 2006/0000656 | A1 | * | 1/2006 | Bisick et al. .................. 180/272 |

FOREIGN PATENT DOCUMENTS

WO    2009020453    2/2009
WO    2009040116    4/2009

* cited by examiner

*Primary Examiner* — Tien Dinh
*Assistant Examiner* — Nicholas McFall
(74) *Attorney, Agent, or Firm* — Michael Best & Friedrich LLP (57) ABSTRACT

Control station which comprises: a seat (10) for the operator of the said control station, the seat (10) comprising at least one arm rest (30), and a control and command assembly, said assembly comprising a control stick (1) with controls, mechanical components for transmitting and generating forces and movement to and from the control stick (1), components (17) for measuring the position of the control stick (1), and electronic components which are connected to the control stick (1) and via which the control and command assembly is operated, the control stick (1) of the said control station being incorporated in the seat (10), the control stick (1) being situated moreover on the armrest (30).

11 Claims, 8 Drawing Sheets

FIG. 1

Prior art

CONTROL STATION

FIELD OF THE INVENTION

The present invention relates to the configuration of a control station for handling, steering or controlling machinery, vehicles or vehicle equipment, in particular aircraft or aircraft equipment.

PRIOR ART

The operators who handle and/or steer vehicles or equipment, in order to carry out said operations, occupy control stations which are provided for this purpose inside the vehicles in question. Many of these vehicles are controlled by means of control sticks which are operated by the operator in question. In many applications these control sticks, together with their component parts, are very heavy and bulky so that they must be housed in large-size and heavy units, with the result that the working space available for the operator of the control devices is extremely restricted. This in turn means that said operators find themselves in very uncomfortable conditions in the control stations and at the same time are unable to abandon rapidly their work location in emergency situations.

In the particular case of control stations for handling and/or piloting aircraft or aircraft equipment, the above factors are particularly critical and even more so in the case of equipment for the in-flight refuelling operations of aircraft.

Thus, one of the methods which are used at present for the in-flight refuelling operations of an aircraft is based on the use of an arm-like or mast-like device called a "boom" which has a telescopically extendable inner section by means of which fuel is transferred from the tanker aircraft to the receiver aircraft. This boom or mast is joined to the tanker aircraft by means of an articulated system which is controlled and operated by means of an operator inside the tanker aircraft, referred to as a "boomer". The boomer operates, on the one hand, a control or command stick which controls the movements of the said boom when moving the boom towards and centring it with respect to the receiver aircraft which is to be refuelled, so that operation of the boom is based on flight control laws. Moreover, the boomer operates a control or command stick which controls the extension and retraction movements of the boom, as well as rotation of said boom, during movement of the boom towards the receiver aircraft and connection thereto.

The document U.S. Pat. No. 4,298,176 discloses a cockpit arrangement inside which a boomer operates, performing in-flight refuelling operations by means of an improved system for three-dimensional viewing using multiple video cameras. According to the description provided in the above document, the control stick operated by the boomer is arranged on a console, together with the viewing equipment, this arrangement suffering from the typical problems of lack of free space for the boomer and the limited accessibility thereof, resulting in serious problems in terms of active safety during the operations to be performed by the boomer.

Figure 1:
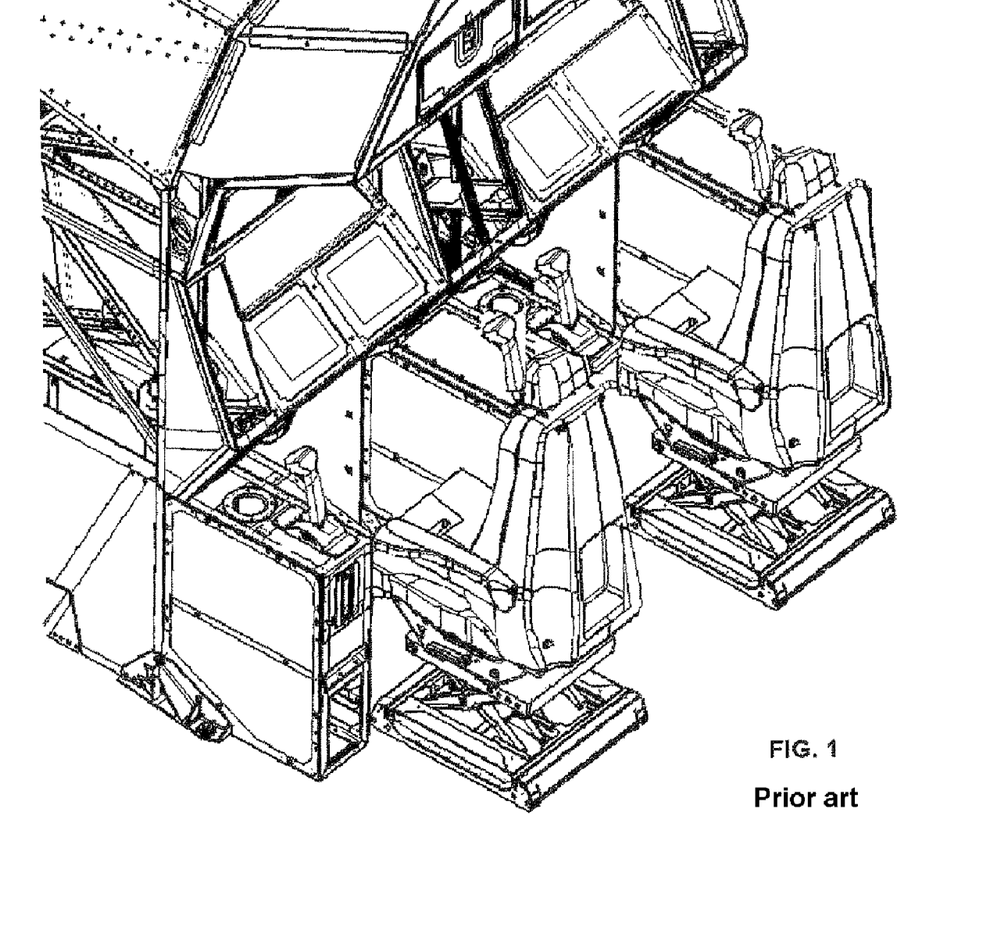
FIG. 1 shows in schematic form the layout of the components of the control station occupied by the operator of the control equipment of an aircraft, according to the prior art.
Figure 2:
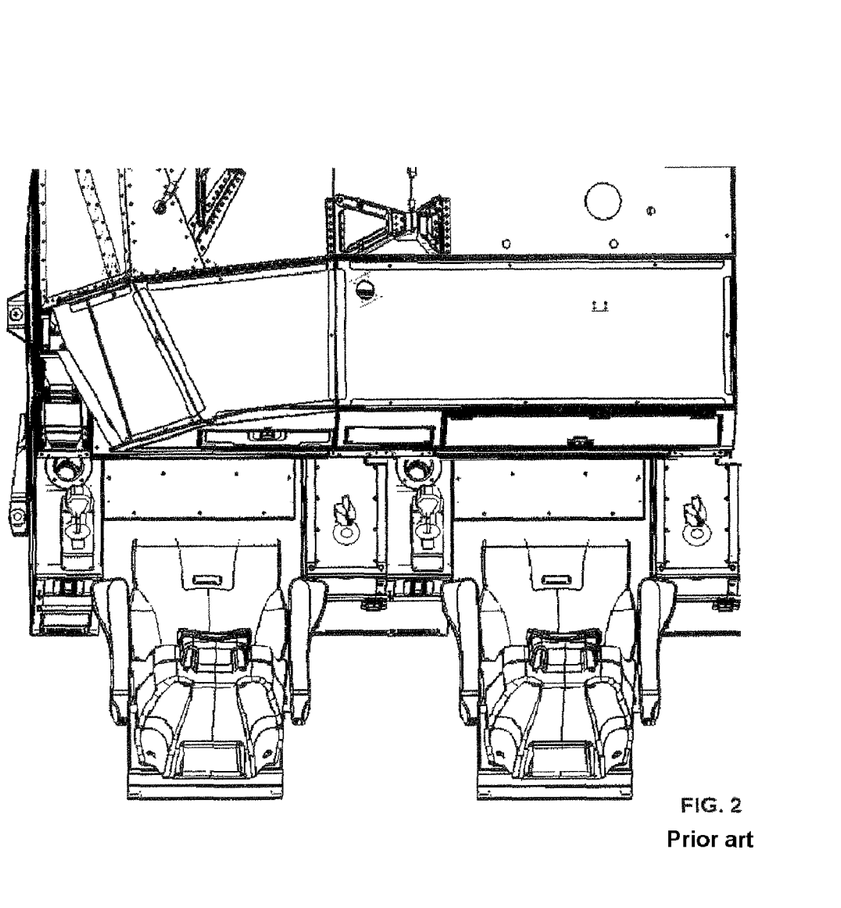
FIG. 2 shows schematically a plan view of the layout of the components of the control station occupied by the operator of the control equipment of an aircraft shown in FIG. 1, according to the prior art.

The control sticks which are at present used for the above operations, together with its component parts, are very heavy and bulky, so that they must be incorporated in specially designed units, called consoles, as shown in the accompanying FIGS. 1 and 2.

The known control sticks situated on consoles have the problem that they leave very little free space for the arrangement of the control stations used by the boomers, these stations, mainly because of the body proportions, being very small in size, resulting in a very uncomfortable position for the said boomers.

Moreover, the known arrangement results in active safety problems which are directly related to problems of limited accessibility for the boomers, preventing the boomer from leaving his/her work location rapidly in a given emergency situation since the control stick is arranged on a heavy and fixed structure, such as the console described above.

Furthermore, operation by the boomer of the control sticks arranged on the above consoles is awkward and imprecise since the boomer must operate said sticks with the arm raised and not resting, due to their layout, this resulting in a high degree of risk especially during operations which are so critical and precise such as in-flight refuelling operations.

The present invention aims to solve the above-mentioned problems.

DISCLOSURE OF THE INVENTION

The invention thus relates to a control station for handling, steering or controlling machinery, vehicles or vehicle equipment, in particular aircraft or aircraft equipment and, even more particularly, aircraft equipment during in-flight refuelling operations.

The invention relates to a handling and/or steering control station which comprises a seat for the operator of the said control station, the seat comprising at least one armrest, and a control and command assembly, said control and command assembly comprising a control stick with controls, mechanical components for transmitting and generating forces and movement to and from the control stick, components for measuring the position of the control stick, and electronic components which are connected to the control stick and via which the control and command assembly is operated and the commands are transmitted to the machinery or component which is controlled, the control stick in said control station being incorporated in the seat, such that the said control stick is situated on the armrest.

Moreover, the armrest on which the control stick is situated is able to rotate about two different axes so that, on the one hand, the position of the armrest may be adapted to suit the operator so as to optimize handling of the control stick and so that, on the other hand, the operator is able to leave the seat more easily.

In addition, the armrest of the control station according to the invention on which the control stick is situated is configured in such a way that it can be retracted or extended parallel to itself so that, on the one hand, the position and/or the length of the armrest can be adapted to suit the operator so as to optimize handling of the stick and so that, on the other hand, when retracted, it allows the said operator to leave the seat more easily.

Thus the control station configuration according to the invention, with elimination of the console, is less heavy and consequently less costly than conventional configurations. Moreover, there is a greater amount of space available, both locally and more generally, within the location where the operator of the control station in question is working, as a result of elimination of the said console, there existing therefore better access to the control station by the operator whose physical safety is also better guaranteed in the event of an emergency.

Furthermore, the configuration of the control station according to the invention, since it can be adapted to suit each operator, ensures perfect ergonomic conditions for the operator during the operations which he/she performs, resulting in greater safety when carrying out said operations.

The configuration of the control station according to the invention is such that the operators perform handling and/or steering of the control devices of the vehicle keeping their arm resting on the armrest of their seat, thereby increasing greatly the precision and the control with which said operators operate the control and command assembly of the control station, in particular the control stick thereof.

Other characteristic features and advantages of the present invention will emerge more clearly from the detailed description which follows with reference to the accompanying figures.

DETAILED DESCRIPTION OF THE INVENTION

The invention relates to a station for handling, steering or controlling machinery, vehicles or vehicle equipment, in particular aircraft or aircraft equipment, and even more particularly aircraft equipment during in-flight refuelling operations. Thus, according to one of the preferred embodiments of the invention, a station for the operator or boomer operating the boom of a tanker aircraft during in-flight refuelling operations is described.

Figure 3:
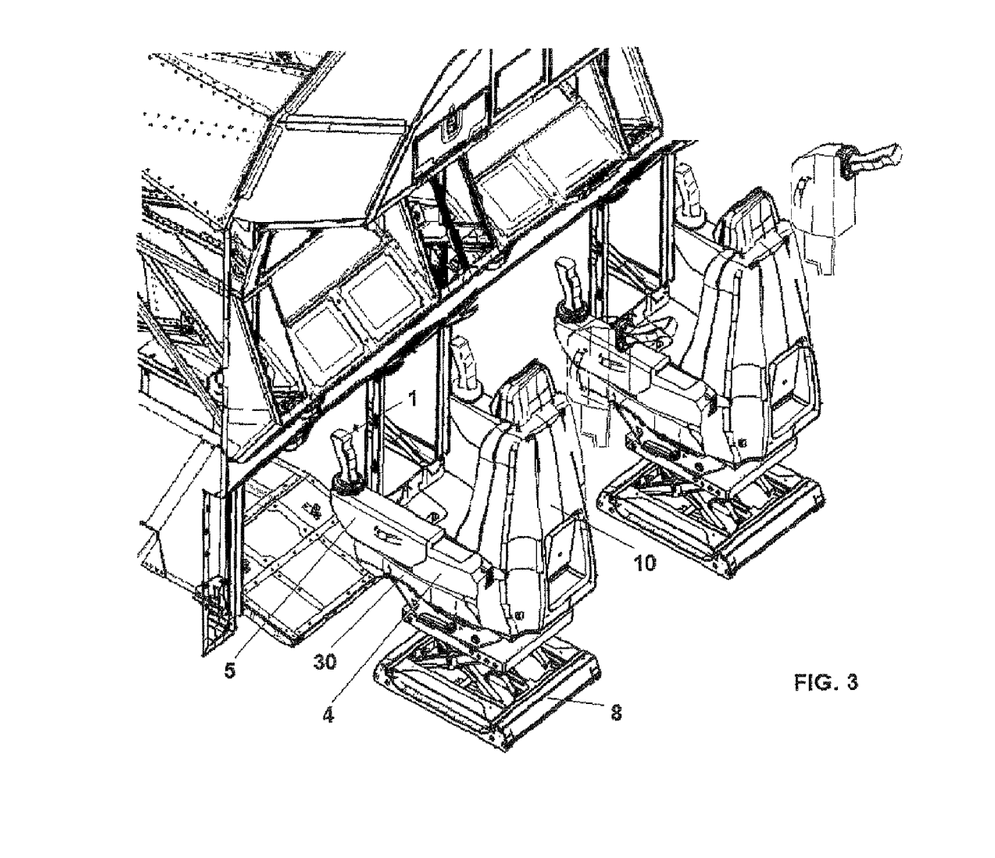
FIG. 3 shows schematically the layout of the components of the control station occupied by the operator of the control equipment of an aircraft, according to the present invention.
Figure 4:
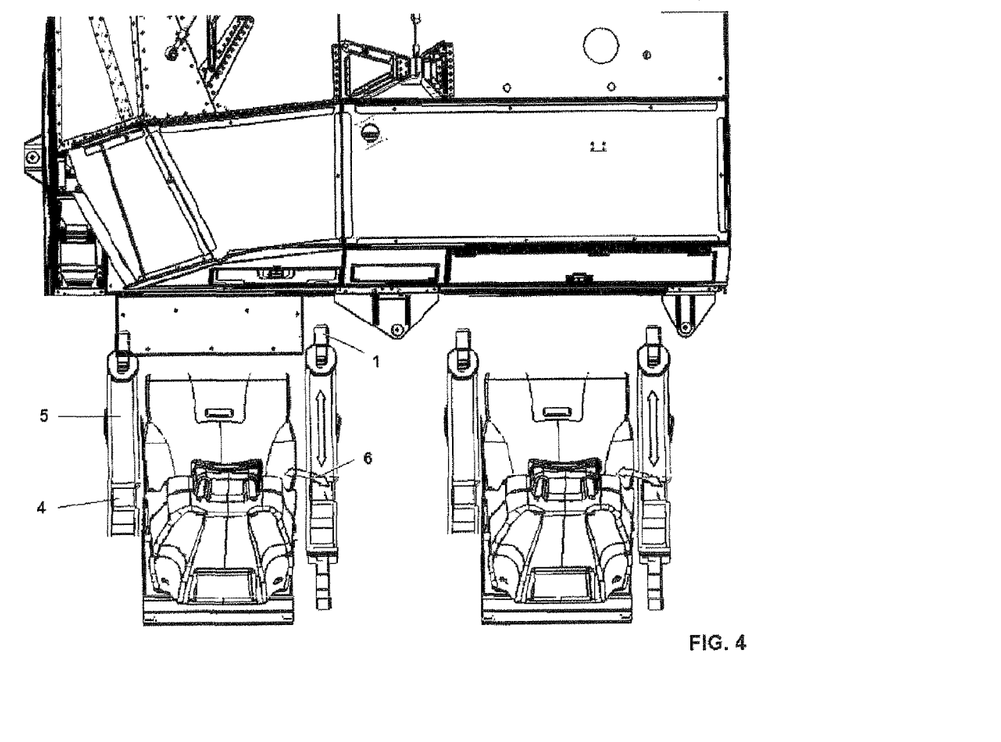
FIG. 4 shows schematically the layout of the components of the control station occupied by the operator of the control equipment of an aircraft shown in FIG. 3, according to the present invention.

The control station according to the invention thus comprises a seat 10 for the boomer, the seat 10 comprising at least one armrest 30 and a control and command assembly, said control and command assembly comprising a control stick 1 with controls, mechanical components for transmitting and generating forces and movement to and from the control stick 1, components 17 for measuring the position of the control stick 1, and electronic components which are connected to the control stick 1 and via which the control and command assembly is operated. In the said control station the control stick 1 is incorporated in the seat 10, the control stick 1 being situated on the armrest 30, as can be seen in FIG. 3.

The seat 10 for the boomer comprises at least one armrest 30 which is designed so that the boomer can rest his/her arm in order to operate the control and command assembly via the control stick 1, said armrest 30 comprising in turn the above control stick 1.

Figure 5:
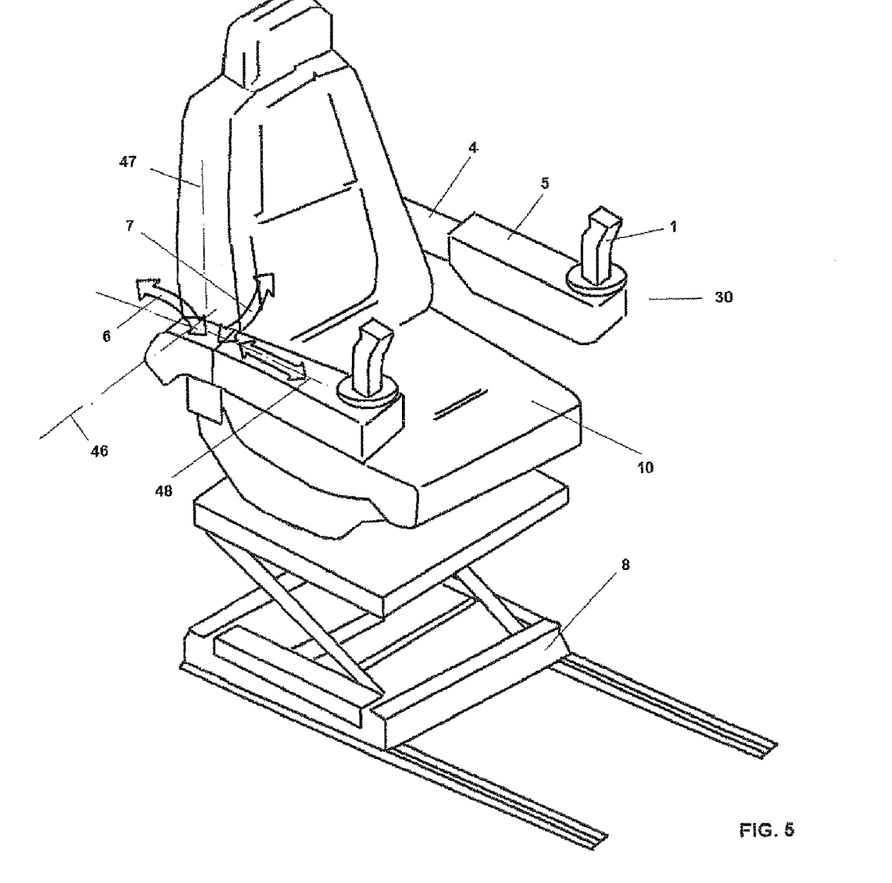
FIG. 5 shows in detail the seat of the control station according to the present invention.

As shown in FIG. 5, the armrest 30 comprises in turn a structural part 4 and a retractable part 5. The structural part 4 of the armrest 30 has various degrees of freedom of movement and is able to perform at least the following movements: a movement or rotation 6 relative to an axis 46 substantially perpendicular to the longitudinal direction of the armrest 30 (represented by the axis 48) so as to fold down the armrest 30 completely; and a movement or rotation 7 relative to an axis 47 substantially perpendicular to the longitudinal direction of the armrest 30 so as to perform a rotation of the armrest 30, allowing the boomer to pass through, the axes 46 and 47 being in turn substantially perpendicular to each other.

The retractable part 5 of the armrest 30 allows telescopic extension thereof along the structural part 4, performing a displacement along the axis 48 (see FIG. 5).

The control and command assembly of the control station according to the invention comprises, in addition to the control stick 1, mechanical components (FIG. 7) for transmitting and generating forces and movement to and from the control stick 1, as well as electronic components (FIG. 6) which are connected to the control stick 1 and via which the control and command assembly is operated.

Figure 6:
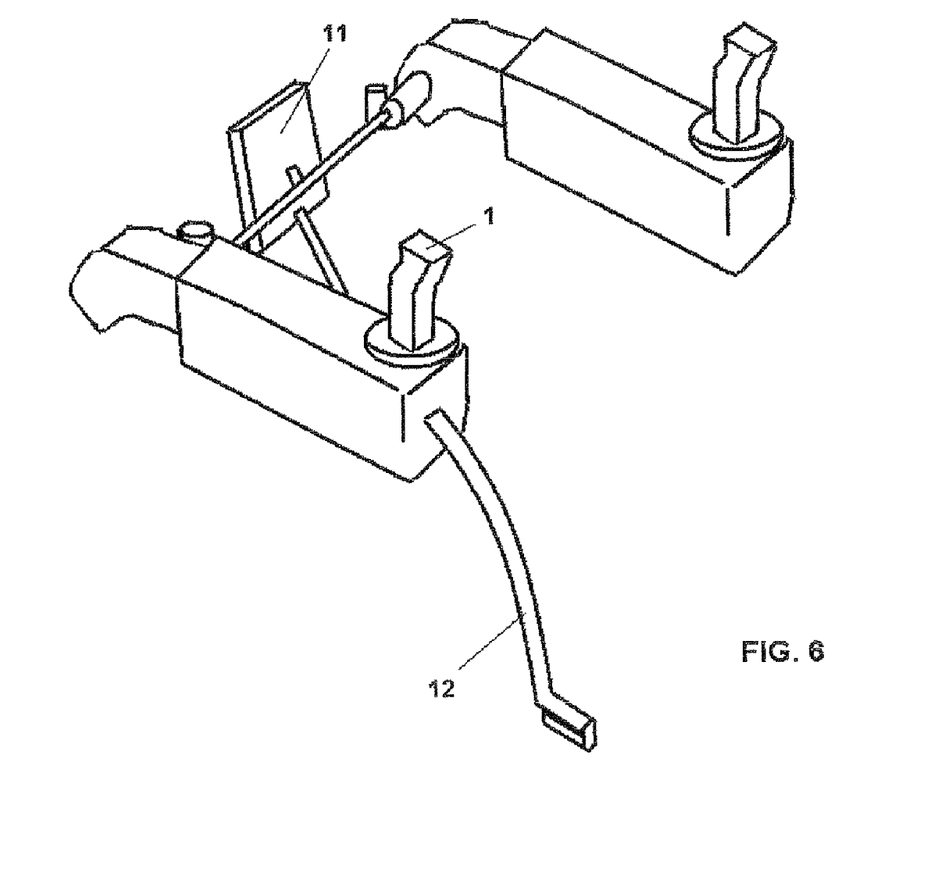
FIG. 6 shows schematically the electronic components of the control station according to the present invention.
Figure 7:
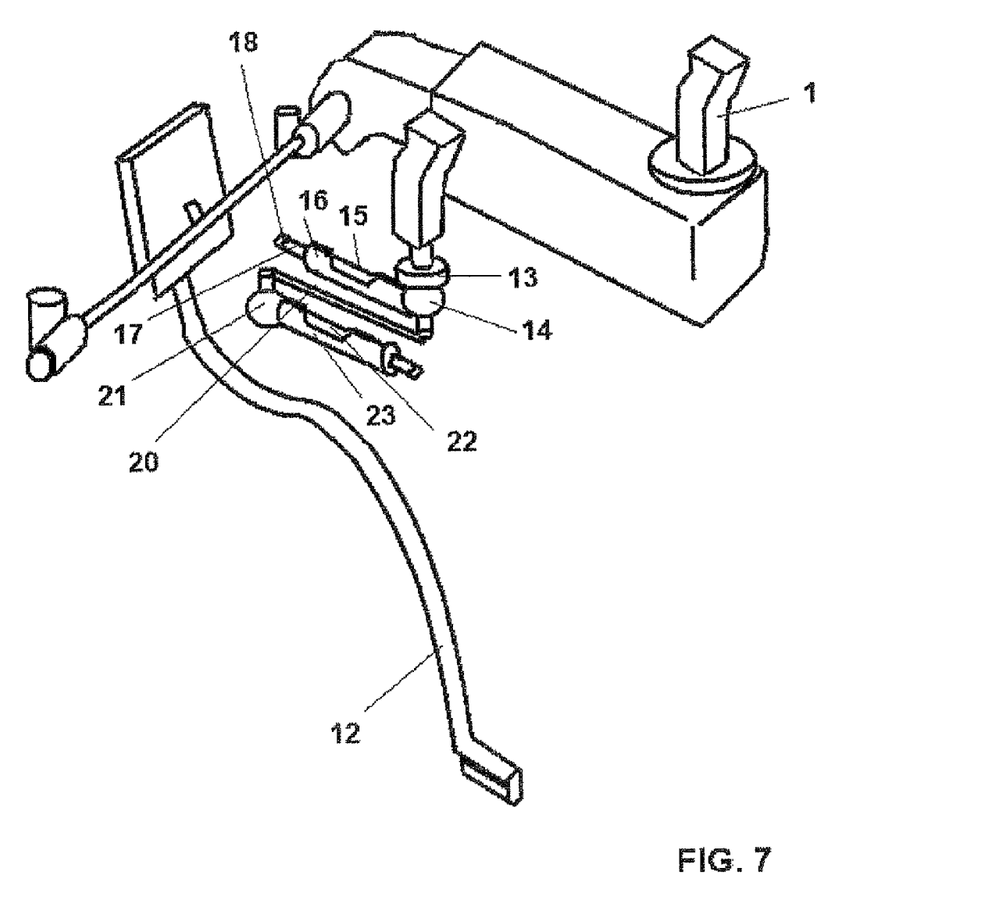
FIG. 7 shows schematically the mechanical components of the control station according to the present invention.

The electronic components of the control and command assembly comprise in turn: an electronic housing 11 which connects together various control sticks 1, performing the control functions of the control station; an interface 12 for the input/output of data into/from the vehicle, aircraft or part which is to be controlled.

The electronic components which are directly connected to the control stick 1 may in turn comprise: a load cell 13; a first group 14 and a second group 21 of mechanical transmission mechanisms which are connected via a connection device 20; an oscillating motor 15 which operates an oscillating shaft 16; a pitching motor 22 which operates a pitching shaft 23; at least one component 17 for measuring the degrees of rotation of either one or both the shafts 16 and 23, which may be independent or not, so that these measuring components 17 provide information regarding the position of the control stick 1; at least two centring devices 18, which may be independent or not, one for the oscillating shaft 16 and the other for the pitching shaft 23.

According to the invention, and contrary to what was the case with the known systems in which the control stick was arranged on a fixed console, the seat 10 on which the control stick 1 is arranged is movable so that the (mechanical and electrical) connections and wiring must be specifically designed for it. Thus, the wiring and connections connect the components of the control and command assembly and the armrest 30 situated on the seat 10 to other devices situated outside the seat 10 and/or to the power supply, the said wiring and connections being suitable for use in a seat 10 movable relative to the surface on which it is located.

The main problem which the invention has to solve is that of incorporating all the components of the control and command assembly (stick 1, mechanical components and electrical components), which traditionally occupied a large amount of space because they were situated in/on a console, in the seat 10, ensuring that they occupy a lot less space; in fact the seat 10 cannot be excessively wide, large or heavy since this would constitute a structural problem and would result in loss of the ergonomic advantages associated therewith.

The invention solves the above, firstly, by separating the mechanical components and the electronic components of the control stick 1, as described above. Secondly, the mechanical components of the control and command assembly are designed so as to be much more compact, such that: the mechanical components of the control and command assembly comprise an oscillating shaft 16 and a pitching shaft 23, such that said shafts 16 and are arranged parallel, adopting a mechanical/kinematic solution which comprises a so-called "nutating" or oscillating linkage system which is able to convert the linear movement into a rotational movement, thereby achieving a totally linear correspondence between the input movement and the output movement of the control stick 1.

If, in the case of a normal ball joint, the axis for application of the linear movement and the axis of rotation are situated perpendicularly, in the oscillating linkage system according to the invention (FIG. 8) the axis of rotation 41 of the fork 40 of the pitching motor 22 forms an angle different from 90° relative to the connection device 20 so that a displacement of said connection device 20, in addition to producing a rotational movement of the rotational shaft 41, will produce a second rotational movement of the pitching shaft 23, said shaft being located in the same plane as the shaft of the connection device 20 and integral with the rotational shaft 41.

Figure 8:
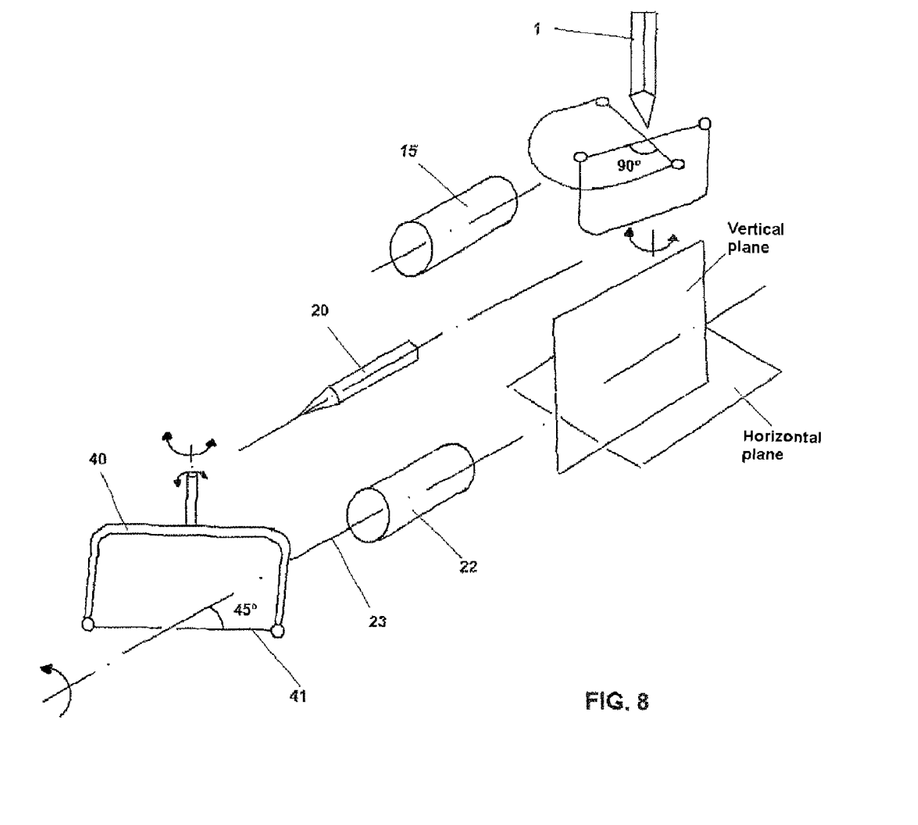
FIG. 8 illustrates schematically the operation of the oscillating linkage system used for the mechanical components of the control station according to the present invention.

With this mechanical solution it is possible to arrange the shafts 16 and 23 parallel and very close together, with the motors 15 and 22 also very close, thereby resulting in a more compact volume which can be easily adapted to the seat 10. The usual configuration comprises, on the other hand, two perpendicular shafts with the respective actuators or motors which, via a mechanical coupling, are connected to the control stick: this configuration occupies much more space.

Without varying the external configuration of the control stick 1, with one of the shafts 16 or 23 or both of them being locked, the present invention allows the independent movement of either one of the two shafts or both of them.

Although the present invention has been described entirely in connection with preferred embodiments, it is clearly possible to make all those modifications which are within the scope of the following claims, without said scope being regarded as limited by the above embodiments.

The invention claimed is:

1. Control station for an aircraft which comprises: an aircraft seat (10) for the operator of the said control station, the aircraft seat (10) comprising a seating portion, a back portion, and at least one arm rest (30) having a longitudinal axis extending along the length thereof, the back portion having a bisecting line dividing a top half and a bottom half, and the at least one arm rest coupled to the aircraft seat below the bisecting line, and a control and command assembly, said control and command assembly comprising a control stick (1) with controls, mechanical components for transmitting and generating forces and movement to and from the control stick (1), components (17) for measuring the position of the control stick (1) and electronic components which are connected to the control stick (1) and via which the control and command assembly is operated;

characterized in that in said control station the control stick (1) is incorporated in the aircraft seat (10), the control stick (1) being situated on the armrest (30); and wherein the arm rest (30) rotates relative to two axes that are substantially perpendicular to the longitudinal axis of the arm rest, and extends and retracts along the longitudinal axis so that the position of the armrest, the length of the arm rest, or both can be adapted to suit the operator.

2. Control station according to claim 1, characterized in that the mechanical components of the control and command assembly are situated in the armrest (30).

3. Control station according to claim 1, characterized in that at least some of the electronic components of the control and command assembly are situated in a location different from that of the armrest (30), separate from the control stick (1).

4. Control station according to claim 1, wherein the position of the armrest, the length of the arm rest (30), or both can be adapted to suit the operator so as to optimize handling of the stick (1) and so that when retracted, it allows the operator to leave the aircraft seat (10) more easily.

5. Control station according to claim 1, characterized in that the aircraft seat (10) is movable relative to the surface on which it is arranged.

6. Control station according to claim 5, characterized in that it comprises wiring and connections which connect the components of the control and command assembly and the at least one armrest (30) situated on the aircraft seat (10) to other devices situated outside of the aircraft seat (10), the power supply, or both, the said wiring and connections being adapted for use thereof with an aircraft seat (10) which is movable relative to the surface on which it is arranged.

7. Control station according to claim 6, characterized in that the said wiring and connections are of the flexible type or telescopic type.

8. Control station according to claim 1, characterized in that the control and command assembly comprises at least two electric motors (15, 22) which operate as means for generating force on the control stick (1), said motors (15, 22) being situated inside the armrest (30) on which the control stick (1) is situated so that rotational shafts (16, 23) of said motors are substantially parallel.

9. Control station according to claim 8, characterized in that the rotational shafts (16, 23) of the electric motors (15, 22) are substantially parallel owing to an oscillating linkage system capable of converting the linear movement into a rotational movement, thereby achieving a totally linear correspondence between the input movement and the output movement of the control stick (1).

10. Control station according to claim 1, characterized in that the control and command assembly at least one of handles and pilots equipment of an aircraft.

11. Control station according to claim 10, characterized in that the control and command assembly at least one of handles and pilots equipment of an aircraft during in-flight refueling operations.

* * * * *